United States Patent
Wang et al.

(10) Patent No.: US 12,271,829 B2
(45) Date of Patent: Apr. 8, 2025

(54) METHOD, ELECTRONIC DEVICE, AND COMPUTER PROGRAM PRODUCT FOR MANAGING TRAINING DATA

(71) Applicant: Dell Products L.P., Round Rock, TX (US)

(72) Inventors: Zijia Wang, WeiFang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 643 days.

(21) Appl. No.: 17/666,736

(22) Filed: Feb. 8, 2022

(65) Prior Publication Data
US 2023/0237344 A1 Jul. 27, 2023

(30) Foreign Application Priority Data
Jan. 21, 2022 (CN) .......................... 202210073368.5

(51) Int. Cl.
*G06F 16/00* (2019.01)
*G06F 16/25* (2019.01)
*G06N 5/022* (2023.01)

(52) U.S. Cl.
CPC ........... *G06N 5/022* (2013.01); *G06F 16/258* (2019.01)

(58) Field of Classification Search
None
See application file for complete search history.

(56) References Cited

U.S. PATENT DOCUMENTS

| 10,614,373 B1* | 4/2020 | Jeffery | G06N 5/04 |
| 2019/0378044 A1* | 12/2019 | Jeffery | G06N 20/00 |
| 2024/0152821 A1* | 5/2024 | Russenes | G06N 20/00 |

OTHER PUBLICATIONS

T. Wang et al., "Dataset Distillation," arXiv:1811.10959v3, Feb. 24, 2020, 14 pages.
Y. Lecun et al., "GradientBased Learning Applied to Document Recognition," Proceedings of the IEEE, vol. 86, No. 11, Nov. 1998, pp. 2278-2324.
G. Hinton et al., "Distilling the Knowledge in a Neural Network," arXiv:1503.02531v1, Mar. 9, 2015, 9 pages.
E. Strubell et al., "Energy and Policy Considerations for Deep Learning in NLP," arXiv:1906.02243v1, Jun. 5, 2019, 6 pages.
C. Zhang et al., "Understanding Deep Learning Requires Rethinking Generalization," arXiv:1611.03530v2, Feb. 26, 2017, 15 pages.
The Linux Foundation, "Pravega Concepts," https://cncf.pravega.io/docs/nightly/pravega-concepts/, Accessed Feb. 6, 2022, 12 pages.

* cited by examiner

*Primary Examiner* — Bai D Vu
(74) *Attorney, Agent, or Firm* — Ryan, Mason & Lewis, LLP

(57) ABSTRACT

In a method for managing training data in an illustrative embodiment, in response to a determination that new training data is collected by a sensor, the new training data is stored into a collected data stream of a storage pool; in response to a determination that the new training data and historical data stored in a full data stream of the storage pool are refined into refined training data, the refined training data is stored into a refined data stream of the storage pool; and the new training data is stored into the full data stream. In this way, data streams become clear and storage costs are reduced. This greatly reduces the difficulty of developing complex scenarios such as autonomous driving.

20 Claims, 3 Drawing Sheets

METHOD, ELECTRONIC DEVICE, AND COMPUTER PROGRAM PRODUCT FOR MANAGING TRAINING DATA

RELATED APPLICATION(S)

The present application claims priority to Chinese Patent Application No. 202210073368.5, filed Jan. 21, 2022, and entitled "Method, Electronic Device, and Computer Program Product for Managing Training Data," which is incorporated by reference herein in its entirety.

FIELD

Embodiments of the present disclosure relate to the field of streaming storage, and more particularly relate to a method, an electronic device, and a computer program product for managing training data.

BACKGROUND

Edge intelligence refers to a set of connected systems and devices for data collection, caching, processing, and analysis, which is close to a position where data is captured based on artificial intelligence. Edge intelligence is designed to enhance data processing and protect privacy and security of data and users.

SUMMARY

In a first aspect of the present disclosure, a method for managing training data is provided. The method includes storing, in response to a determination that new training data is collected by a sensor, the new training data into a collected data stream of a storage pool. The method further includes storing, in response to a determination that the new training data and historical data stored in a full data stream of the storage pool are refined into refined training data, the refined training data into a refined data stream of the storage pool. The method further includes storing the new training data into the full data stream.

In a second aspect of the present disclosure, an electronic device is provided. The electronic device includes a processor and a memory coupled to the processor, the memory having instructions stored therein which, when executed by the processor, cause the device to perform actions. The actions include storing, in response to a determination that new training data is collected by a sensor, the new training data into a collected data stream of a storage pool. The actions further include storing, in response to a determination that the new training data and historical data stored in a full data stream of the storage pool are refined into refined training data, the refined training data into a refined data stream of the storage pool. The actions further include storing the new training data into the full data stream.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent from the following description of example embodiments of the present disclosure with reference to the accompanying drawings. In the example embodiments of the present disclosure, the same reference numerals generally represent the same elements. In the accompanying drawings.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or the same objects. Other explicit and implicit definitions may also be included below.

As described above, edge intelligence refers to a set of connected systems and devices for data collection, caching, processing, and analysis, which is close to a position where data is captured based on artificial intelligence. Edge intelligence is designed to enhance data processing and protect privacy and security of data and users. However, current solutions cannot handle complex data sources, and the efficiency and robustness are not high.

Embodiments of the present disclosure provide a solution for managing training data, and by clearly defining data streams, developers can easily acquire data from complex data sources.

According to various embodiments of the present disclosure, in response to a determination that new training data is collected by a sensor, the new training data is stored into a collected data stream of a storage pool. Historical data is stored in a full data stream of the storage pool. The new training data and the historical data can be refined into refined training data. The refined training data may be stored in a refined data stream of the storage pool. Then, the new training data is stored into the full data stream.

According to embodiments described herein, data streams become clear and storage costs are reduced. AI developers can focus on the algorithm part without thinking about real-world issues such as data management and noise. This greatly reduces the difficulty of developing complex scenarios such as autonomous driving.

The basic principles and some example implementations of the present disclosure will be described below with reference to the accompanying drawings. It should be understood that these example embodiments are given only to enable those skilled in the art to better understand and thus implement embodiments of the present disclosure, and are not intended to limit the scope of the present disclosure in any way.

Figure 1:
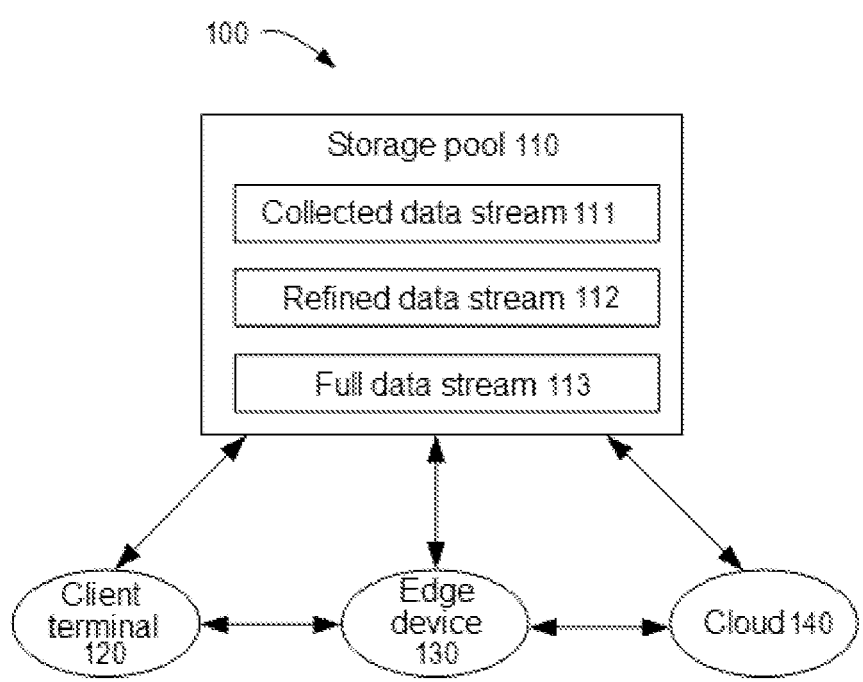
FIG. 1 shows a schematic diagram of an example environment in which embodiments of the present disclosure can be implemented.

FIG. 1 shows a schematic diagram of an example environment 100 in which embodiments of the present disclosure can be implemented. As shown in FIG. 1, environment 100 may include storage pool 110, client terminal 120, edge device 130, and cloud 140. Storage pool 110 is a storage structure based on a streaming storage architecture (e.g., a Pravega architecture). Storage pool 110 may be established in all or any of client terminal 120, edge device 130, and cloud 140.

Client terminal 120, edge device 130, and cloud 140 can read data from storage pool 110, and can also store data into storage pool 110. Client terminal 120 may include a sensor (not shown). Client terminal 120 may use the sensor to collect data and perform model inference. Edge device 130 may perform data assessment and ensure data security. Cloud 140 can handle services that require high computing resources and high performance.

It should be understood that although FIG. 1 shows that storage pool 110 is located outside client terminal 120, edge device 130, and cloud 140, this is only for the convenience of description, and is not intended to limit affiliation relationships between storage pool 110 and client terminal 120, edge device 130, and cloud 140.

In storage pool 110, data streams based on a streaming storage architecture (e.g., a Pravega architecture) can be defined as follows: collected data stream 111, refined data stream 112, and full data stream 113. Collected data stream 111 is used for storing new training data collected by the sensor. Refined data stream 112 is used for storing refined training data. Full data stream 113 may be used for storing all training data, including historical data as well as collected new training data. The defined data streams may include historical data and information about a developer.

It should be understood that the structure and functions of environment 100 are described for illustrative purposes only and do not imply any limitation to the scope of the present disclosure. For example, embodiments of the present disclosure may also be applied to an environment different from environment 100. Although only one client terminal 120, edge device 130, and cloud 140 are shown in FIG. 1, it is not limited to this, and more client terminals 120, edge devices 130, and clouds 140 may be included.

Figure 2:
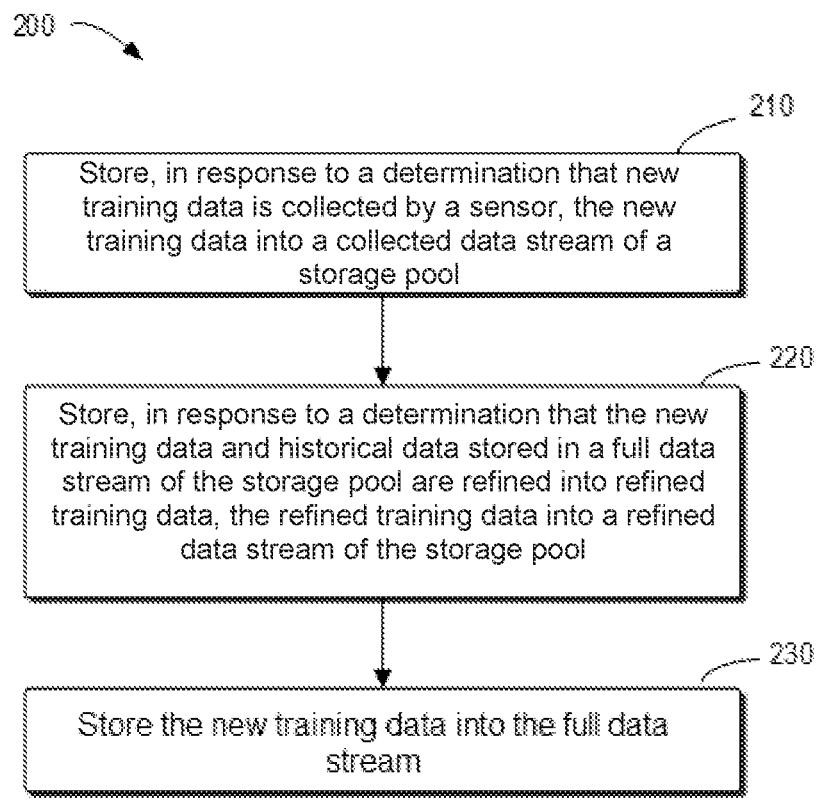
FIG. 2 shows a flow chart of an example method for managing training data according to an embodiment of the present disclosure.

FIG. 2 shows a flow chart of example method 200 for managing training data according to an embodiment of the present disclosure. Method 200 can be performed, for example, in environment 100 as shown in FIG. 1. It should be understood that method 200 may also include additional actions not shown and/or may omit actions shown, and the scope of the present disclosure is not limited in this regard. Method 200 will be described in detail below with reference to FIG. 1.

At block 210, in response to a determination that new training data is collected by a sensor, the new training data is stored into collected data stream 111 of storage pool 110.

For example, when client terminal 120 uses a trained traffic sign recognition model to recognize a traffic sign, a sensor of client terminal 120 collects several images that the model cannot recognize. These images may be stored into collected data stream 111 of storage pool 110 as new training data.

At block 220, in response to a determination that the new training data and historical data stored in full data stream 113 of storage pool 110 are refined into refined training data, the refined training data is stored into refined data stream 112 of storage pool 110.

In addition to the already problematic financial cost and time requirements, training of a machine learning model has extremely high energy consumption. To alleviate these problems and improve training efficiency, one solution is to reduce the size of a training network, which may be referred to as knowledge distillation. Another solution is to reduce the size of a training dataset instead of reducing the size of a training network. Dataset distillation has recently been proposed as an alternative to knowledge distillation.

The dataset distillation is a process of creating a small number of synthetic samples. These samples can quickly train a network to an accuracy the same as that when the network is trained on an original dataset. This works for models with known initializations.

Using such a dataset distillation method, the collected new training data, along with the historical data stored in full data stream 113, can be refined into refined training data. The refined training data may be stored in refined data stream 112.

In this way, illustrative embodiments can help relieve the burden on a data stream management tool. Data contained in the data stream is greatly reduced.

In some embodiments, client terminal 120 requests edge device 130 for a quick update of a model (e.g., a traffic sign recognition model) to recognize, for example, a sign that has not been seen before. Edge device 130 starts to quickly update the model in response to the request of client terminal 120. Therefore, edge device 130 needs to use the training data in storage pool 110.

As described before, retraining the model with the refined training data can achieve the same accuracy as when the training is performed with a full dataset. Therefore, in response to receiving a use request for training data from edge device 130, new training data from collected data stream 111 and training data from refined data stream 112 may be provided to edge device 130. Alternatively or additionally, edge device 130 may be provided with new training data from collected data stream 111 and historical data from full data stream 113 if edge device 130 has access to a historical dataset.

A dataset distillation algorithm is implemented by cloud 140 to refine the training data. The refined training data is then transmitted to edge device 130 to perform fast model update.

In some embodiments, rapid update to the model may be performed by client terminal 120. In such case, the new training data from collected data stream 111 and the training data from refined data stream 112 may be provided to client terminal 120. Alternatively or additionally, client terminal 120 may be provided with new training data from collected data stream 111 and historical data from full data stream 113 if client terminal 120 has access to a historical dataset.

In this way, computational costs can be reduced, and the quality and security of the data streams can be improved. Privacy-preserving data streams can be implemented.

In some embodiments, client terminal 120 requests cloud 140 to retrain a model (e.g., a traffic sign recognition model), or cloud 140 needs to synthesize data from multiple edge devices 130 for collaborative model update. Therefore, training data is provided from collected data stream 111 and full data stream 113 in response to receiving a use request for training data from cloud 140.

In this way, it is ensured that the model can still be trained using the full training dataset.

In some embodiments, noise labels are removed from the new training data and the historical data before the new training data and the historical data are refined.

With the advent of large-scale datasets, neural networks have shown impressive performance in numerous machine learning tasks such as computer vision, information retrieval, and language processing. Such success depends on the availability of a large amount of carefully labeled data, which is expensive and time-consuming. Some non-expert sources are widely used to reduce high labeling costs. However, using these sources often results in unreliable labels. In addition, data labeling may be very complicated even for the inexperienced. Such unreliable labels are referred to as noise labels. In the presence of noise labels, training a model is susceptible to noise labels because a large number of model parameters may cause overfitting of the neural network.

Therefore, in order to cause a supervised learning process to be more robust to label noises, the noise labels may be removed from the training data. In this way, storage costs can be reduced, and training efficiency can be improved. Therefore, developers do not need to care about the quality of output data, and can instead just focus on the algorithm part.

At block 230, the new training data is stored into full data stream 113. Thus, the update of historical data is completed. In this way, the integrity of the training data can be guaranteed.

Figure 3:
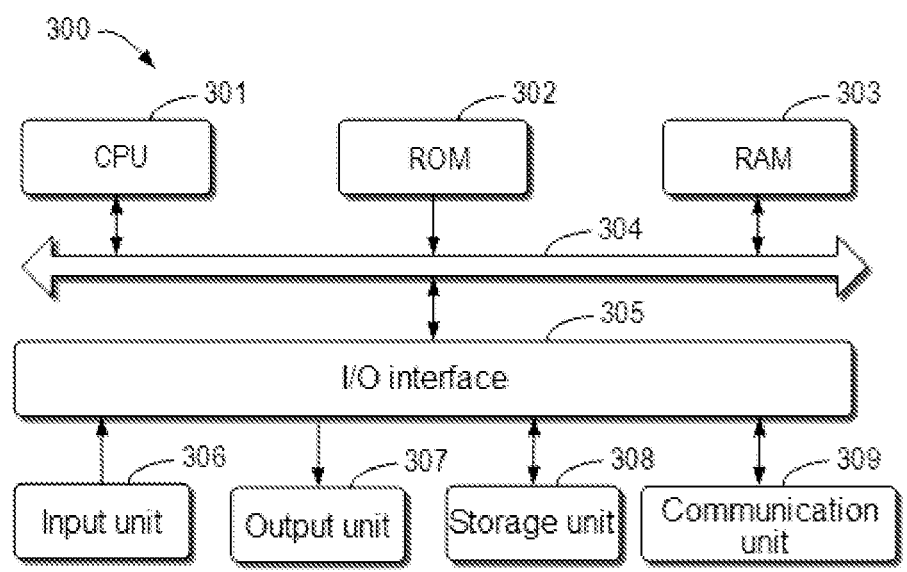
FIG. 3 is a block diagram of an example device that can be used to implement embodiments of the present disclosure.

FIG. 3 is a schematic block diagram of example device 300 that can be configured to implement an embodiment of the present disclosure. For example, storage pool 110 as shown in FIG. 1 may be implemented by device 300. As shown in FIG. 3, device 300 includes central processing unit (CPU) 301 that may perform various appropriate actions and processing according to computer program instructions stored in read-only memory (ROM) 302 or computer program instructions loaded from storage unit 308 into random access memory (RAM) 303. In RAM 303, various programs and data required for the operation of device 300 may also be stored. CPU 301, ROM 302, and RAM 303 are connected to each other through bus 304. Input/output (I/O) interface 305 is also connected to bus 304.

A plurality of components in device 300 are connected to I/O interface 305, including: input unit 306, such as a keyboard and a mouse; output unit 307, such as various types of displays and speakers; storage unit 308, such as a magnetic disk and an optical disc; and communication unit 309, such as a network card, a modem, and a wireless communication transceiver. Communication unit 309 allows device 300 to exchange information/data with other devices via a computer network such as the Internet and/or various telecommunication networks.

The various processes and processing described above, such as method 200, may be performed by CPU 301. For example, in some embodiments, method 200 may be implemented as a computer software program that is tangibly included in a machine-readable medium, such as storage unit 308. In some embodiments, part or all of the computer program may be loaded into and/or installed onto device 300 via ROM 302 and/or communication unit 309. One or more actions of method 200 described above may be performed when the computer program is loaded into RAM 303 and executed by CPU 301.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for managing training data, comprising:
storing, in response to a determination that new training data is collected by a sensor, the new training data into a collected data stream of a storage pool in a processor-based machine learning system;
storing, in response to a determination that the new training data and historical data stored in a full data stream of the storage pool are refined into refined training data utilizing a dataset distillation algorithm, the refined training data into a refined data stream of the storage pool;
storing the new training data into the full data stream of the storage pool; and
providing, in response to receiving a use request for training data from at least one of an edge device and a cloud, training data from at least portions of one or more of the collected data stream, the full data stream and the refined data stream.

2. The method according to claim 1, wherein the providing further comprises:
providing, in response to receiving the use request for training data from the edge device, training data from the collected data stream and the refined data stream.

3. The method according to claim 1, wherein the providing further comprises:
providing, in response to receiving the use request for training data from the cloud, training data from the collected data stream and the full data stream.

4. The method according to claim 1, wherein noise labels are removed from the new training data and the historical data before the new training data and the historical data are refined.

5. The method according to claim 1, wherein the storage pool is configured in accordance with a streaming storage architecture.

6. The method according to claim 1, wherein the storage pool is accessible to each of one or more of a client terminal, an edge device and a cloud associated with the processor-based machine learning system.

7. The method according to claim 1, wherein the new training data collected by the sensor comprises one or more images that could not be recognized by one or more machine learning models of the processor-based machine learning system.

8. An electronic device, comprising:
at least one processor; and
memory coupled to the processor, the memory having instructions stored therein, wherein the instructions, when executed by the processor, cause the electronic device to perform actions comprising:
storing, in response to a determination that new training data is collected by a sensor, the new training data into a collected data stream of a storage pool in a processor-based machine learning system;

storing, in response to a determination that the new training data and historical data stored in a full data stream of the storage pool are refined into refined training data utilizing a dataset distillation algorithm, the refined training data into a refined data stream of the storage pool;

storing the new training data into the full data stream of the storage pool; and providing, in response to receiving a use request for training data from at least one of an edge device and a cloud, training data from at least portions of one or more of the collected data stream, the full data stream and the refined data stream.

9. The electronic device according to claim 8, wherein the providing further comprises:

providing, in response to receiving the use request for training data from the edge device, training data from the collected data stream and the refined data stream.

10. The electronic device according to claim 8, wherein the providing further comprises:

providing, in response to receiving the use request for training data from the cloud, training data from the collected data stream and the full data stream.

11. The electronic device according to claim 8, wherein noise labels are removed from the new training data and the historical data before the new training data and the historical data are refined.

12. The electronic device according to claim 8, wherein the storage pool is configured in accordance with a streaming storage architecture.

13. The electronic device according to claim 8, wherein the storage pool is accessible to each of one or more of a client terminal, an edge device and a cloud associated with the processor-based machine learning system.

14. The electronic device according to claim 8, wherein the new training data collected by the sensor comprises one or more images that could not be recognized by one or more machine learning models of the processor-based machine learning system.

15. A computer program product that is tangibly stored on a non-transitory computer-readable medium and comprises machine-executable instructions, wherein the machine-executable instructions, when executed by a machine, cause the machine to perform a method for managing training data, comprising:

storing, in response to a determination that new training data is collected by a sensor, the new training data into a collected data stream of a storage pool in a processor-based machine learning system;

storing, in response to a determination that the new training data and historical data stored in a full data stream of the storage pool are refined into refined training data utilizing a dataset distillation algorithm, the refined training data into a refined data stream of the storage pool;

storing the new training data into the full data stream of the storage pool; and providing, in response to receiving a use request for training data from at least one of an edge device and a cloud, training data from at least portions of one or more of the collected data stream, the full data stream and the refined data stream.

16. The computer program product according to claim 15, wherein the providing further comprises:

providing, in response to receiving the use request for training data from the edge device, training data from the collected data stream and the refined data stream.

17. The computer program product according to claim 15, wherein the providing further comprises:

providing, in response to receiving the use request for training data from the cloud, training data from the collected data stream and the full data stream.

18. The computer program product according to claim 15, wherein noise labels are removed from the new training data and the historical data before the new training data and the historical data are refined.

19. The computer program product according to claim 15, wherein the storage pool is configured in accordance with a streaming storage architecture.

20. The computer program product according to claim 15, wherein the storage pool is accessible to each of one or more of a client terminal, an edge device and a cloud associated with the processor-based machine learning system.

* * * * *